July 8, 1952  W. E. ELKO  2,602,258

LEADER KEEPER

Filed Sept. 8, 1951

INVENTOR.
WILLIAM E. ELKO
BY Hudson, Boughton,
Williams, David & Hoffmann.
ATTORNEYS Patented July 8, 1952

2,602,258

UNITED STATES PATENT OFFICE 2,602,258

LEADER KEEPER

William E. Elko, Cleveland, Ohio

Application September 8, 1951, Serial No. 245,733

3 Claims. (Cl. 43—57.5)

This invention relates to improvements in leader keepers, that is to say devices for maintaining leaders in good condition for quick attachment to fishing lines.

The equipment collected by a fisherman from time to time and placed in his tackle box is likely to become entangled, so that the removal of some particular article when wanted in a hurry may be delayed. The keeper of the present invention is designed to hold extra leaders in orderly condition so that they will not become entangled with each other or with other items in a tackle box.

One of the objects of the invention therefore is the provision of a keeper upon which a leader may be readily mounted and from which it may be readily removed, but which will hold the leader against accidental displacement and maintain it in such condition that entanglement with other articles will be unlikely.

Another object is the provision of a keeper so constructed that the leader may be placed under tension to hold it against accidental dislodgment from the keeper and including a locking plate for one end of the leader which is adjustable on the keeper and held in adjusted position by the tension under which the leader is placed.

A further object is the provision of a keeper which may be used if the owner so elects for holding fishhooks that are equipped with short leaders.

Still another object is the provision of what may be termed a packaged leader, in other words a keeper and leader combined to be displayed and offered for sale as a unit.

Other objects and features of novelty will appear as I proceed with the description of that embodiment of the invention which, for the purposes of the present application, I have illustrated in the accompanying drawing, in which Fig. 1 is a side view of a keeper with a leader mounted thereon.

Figure 1:
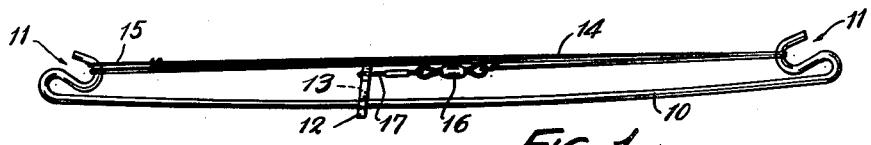
Figure 2:
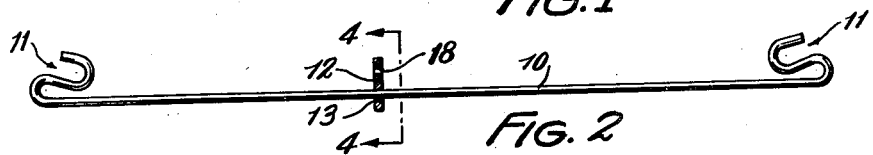
Fig. 2 is a similar view of the keeper alone.
Figure 3:
Fig. 3 is a detail view of a leader of a type in common use such as my keeper is adapted to accommodate.
Figures 4, 5:
Fig. 4 is a view of the locking plate on a larger scale, the view being partly in section on the line 4—4 of Fig. 2.
Fig. 5 is an end view of the keeper.
Figure 6:
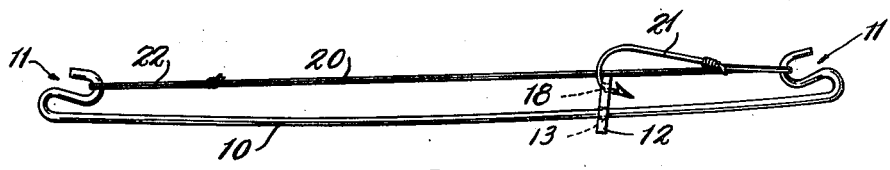
Fig. 6 is a view similar to Fig. 1 but showing a fishhook and short leader mounted on the keeper.

In Fig. 2 which illustrates the keeper, there is shown a relatively straight wire 10 which may be of a length of the order of six inches. At its ends it is formed with hooks 11 which face outwardly or away from each other. They are preferably in the same plane which also includes the straight portion 10. A locking plate 12 is provided with a hole 13 of a diameter slightly larger than the diameter of wire 10, which hole receives the straight part of the wire somewhat loosely, that is with sufficient clearance to enable the plate to be cocked slightly on the wire, as indicated in Figs. 1 and 6. This plate is slidable on the wire so that it may assume any position between the hooks 11.

Leaders such as that shown at 14 are of various lengths. Very frequently they are several times the length of the keeper. At one end such a leader has a loop 15 which may be dropped over one of the hooks 11 of the keeper. The leader may then be passed back and forth over the hooks 11 until the opposite end, which may comprise a swivel 16 and a latch 17, comes somewhere between the two hooks 11. The latch 17 is then connected with the locking plate 12 by being passed through a hole 18 in the plate spaced apart from the previously mentioned hole 13. Now the operator grasps the plate 12 and slides it along the wire 10 away from the hook 11 last engaged by the leader until the leader is rather strongly tensioned. This procedure may bow the keeper wire 10 somewhat, as indicated in Fig. 1. The operator then releases his hold upon the plate 12, whereupon the tension in the leader cocks the plate sufficiently to cause it to firmly grip the wire and thus be held against accidental or unintentional movement on the wire.

Figure 7:
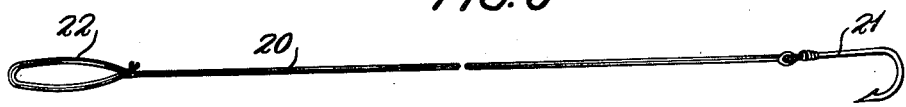
Fig. 7 is a view of a fishhook and short leader removed from the keeper.

In Figs. 6 and 7 there is illustrated the same keeper as in Figs. 1 and 2 but shown as holding a fishhook equipped with a short leader. Here a short leader 20 is permanently attached to a fishhook 21, the leader and hook being sold together. The end of the leader remote from the hook is formed with a loop 22 which is dropped over one of the hooks 11 of the keeper. The leader is then looped over the other hook 11. Next the locking plate 12 is slid upon the wire 10 into position near the right hand end of the keeper as viewed in the drawing so that the point of the fishhook can be readily inserted through the hole 18 of the locking plate, after which the locking plate is pulled toward the left to exert tension on the leader, which cocks the plate and causes it to grip the wire 10. If it is desired to employ the keeper to hold two hooks with short leaders, two plates 12 are mounted on the wire in which event the loop 22 of the second leader is dropped over the hook 11 at the right hand end of the keeper and the second plate 12 is slid into position near the left hand end of the keeper so that the second fishhook can be connected with it. Both plates 12 are pulled to gripping position. Similarly if two hooks with relatively short leaders differing somewhat in length are to be mounted on the keeper, both loops 22 can be dropped over one of the keeper hooks 11 and the two fishhooks attached to the two plates 12 which will then be pulled in the same direction by the user to tension the two leaders and cause the plates to grip the wire 10.

Having thus described my invention, I claim:

1. In a device of the character described, a length of substantially straight wire formed at its ends with outwardly facing hooks disposed in a single plane, a locking plate having a hole therethrough of slightly greater diameter than said wire receiving the wire loosely, whereby a leader may be attached to one hook, looped over one or both of said hooks depending upon the length of the leader, its free end connected with said plate and the plate slid on the wire away from the hook last engaged by the leader to place the leader under tension, cock said plate into wire gripping position and bow the wire between said hooks into tension maintaining condition.

2. In a device of the character described, a length of wire formed at its ends with outwardly facing hooks, a locking plate having two spaced holes therein, one of said holes receiving said wire with clearance sufficient to permit a slight cocking of the plate on the wire, the other hole being adapted to be connected with the free end of a leader attached to one of said hooks and looped over one or both hooks depending upon the length of the leader, whereby the leader may be placed under tension, the locking plate caused to grip the wire and the wire between said hooks bowed accordingly to maintain said tension.

3. A leader package comprising in combination a keeper formed of a length of wire with hooks at the ends thereof, a locking plate having a hole therethrough receiving said wire with clearance sufficient to permit a slight cocking of the plate, a leader attached to one of said hooks and looped over one or both of the hooks depending upon the length of the leader, its free end being attached to said plate at a point spaced from said hole, said plate being spaced from the hook last engaged by the leader sufficiently to place the leader under tension, cock the locking plate into wire gripping position and bow the wire between said hooks into tension maintaining position.

WILLIAM E. ELKO.

REFERENCES CITED

The following references are of record in the file of this patent:

UNITED STATES PATENTS

| Number | Name | Date |
|---|---|---|
| 1,957,352 | Patricoski | May 1, 1934 |
| 2,474,176 | Wenck | June 21, 1949 |

FOREIGN PATENTS

| Number | Country | Date |
|---|---|---|
| 77,882 | Sweden | July 25, 1933 |